July 6, 1971 B. JAFFE 3,591,504

FERROELECTRIC COMPOSITION

Filed Dec. 18, 1967

INVENTOR.
BERNARD JAFFE 3,591,504
FERROELECTRIC COMPOSITION
Bernard Jaffe, South Euclid, Ohio, assignor to Clevite Corporation
Filed Dec. 18, 1967, Ser. No. 691,510
Int. Cl. C04b *35/46, 35/48;* G11b *9/02*
U.S. Cl. 252—62.9 4 Claims

ABSTRACT OF THE DISCLOSURE

An improved solid state switch or multi-state memory is composed of an electroded block of a solid solution of lead zirconate titanate with lanthanum ferrite, with the substitution of a donor additive in the A or B position of the perovskite lattice. For example, antimony is substituted for a portion of the zirconium or a portion of the titanium, or a trivalent atom is substituted for a portion of the lead. A typical composition is:

$$[Pb_{.99}Sb_{.02}(Zr_{.66}Ti_{.34})_{.98}O_3]_{0.9}(LaFeO_3)_{0.1}$$

Figures 1, 2, 3:
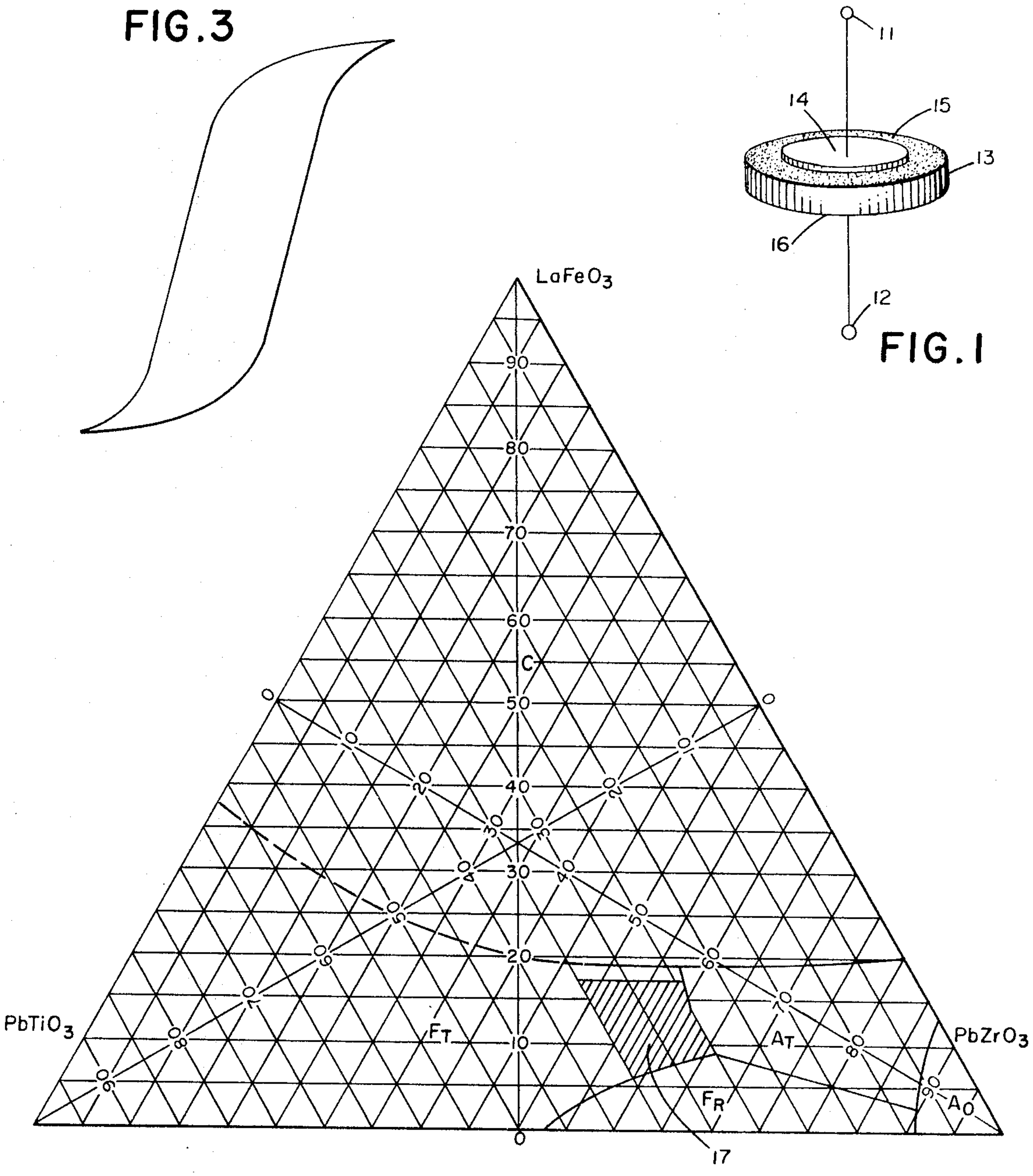

The improved composition gives more favorable switching characteristics both with respect to speed and the number of times satisfactory switching is obtained and little or no degradation takes place.

The invention relates to fast switching ferroelectric memory compositions with improved fatigue resistance.

An object of the invention is to provide a ferroelectric ceramic which will withstand a large number of abrupt steep-wave field reversals with fast response and a minimum of degradation.

A further object of the invention is to utilize a three component solid solution of oxides forming a ferroelectric ceramic at a region of the triangular coordinate phase diagram near the point where the three phase areas come together with proportions of the constituents having a boundary between the tetragonal ferroelectric and tetragonal antiferroelectric phases very close to the antiferroelectric area.

A further object of the invention is to provide a ferroelectric ceramic having a fairly substantial piezoelectric coupling factor with extremely minute lattice distortion. A further object of the invention is to modify a three-constituent solid solution of the foregoing type in such a manner as to raise the electrical volume resistivity, to lower the coercive field and to improve poling properties and squareness of the slow hysteresis loop.

Other and further objects, features, and advantages of the invention will become apparent as the description proceeds.

Ferroelectric ceramics are used as memory elements in various ways. They can be poled bi-stably and then interrogated by a small piezoelectric measuring field at a mechanical resonance. Alternately, they can be interrogated by a resetting pulse which will reset them and pass current only if the resetting pulse is in the reverse direction compared to this setting pulse or existing direction of polarization. This pulse must be of a field strength greater than the coercive field, $E_c$. However, with ceramic compositions heretofore used piezoelectric interrogation is very slow in comparison with systems employing magnetic cores and, therefore, unsatisfactory for use in memory logic and switching systems.

A third method of interrogation is with a pulse just exceeding one-half $E_c$, added to a bias of one-half $E_c$, corresponding to the use of the "half-select" current in systems employing magnetic core elements. Heretofore, this method of utilizing ferroelectric crystals or ceramics has been subject to the drawback of time dependence of $E_c$.

Although the first two methods have been used with some success for ferroelectric ceramics, they too have been subject to drawbacks. First, the switching has been relatively slow compared to magnetics, and second, a serious fatigue effect has been encountered with the vast majority of compositions heretofore available. This fatigue effect consists of a gradual increase of coercive force $E_c$ and decrease in remanent polarization $P_r$ with repeated reversals.

The hysteresis loop becomes widened and "squashed down." Under testing with 60 Hz. applied so as to cause reversal, many compositions heretofore available become unusable after a few minutes to a few hours exposure. The best composition heretofore available has shown an undesirable increase of $E_c$ of 40% and a decrease of $P_r$ of 4% after $2\times10^8$ cycles (1000 hours).

The disadvantages of the composition heretofore available have been overcome, and good switching characteristics have been obtained by employing a composition in which suitable additives are employed or donor elements are substituted in a lead zirconate, lead titanate, lanthanum ferrite system of the type described by Ikeda, Japan. J. Appl. Phys. 3, 493–4 (1964), Japan J. Appl. Phys. 3, 63–71 (1964).

I have found that this type of ternary composition with perovskite end members or a similar quaternary system including also lead stannate may be made suitable for switching devices and memories by introducing an additive or substitution element in the form of a small-atom donor element for one of the small atoms in the perovskite structure in the B position or a large atom donor element for a large atom element in the A position in the perovskite structure. An illustrative quaternary system is $$Pb_{.89}La_{.1}Fe_{.1}(Zr_{.9-y}Ti_ySn_{.1})_{.88}Sb_{.02}O_3$$

A better understanding of the invention will be afforded by the following detailed description considered in conjunction with the accompanying drawing in which FIG. 1 is a schematic diagram of a ceramic memory element forming an embodiment of the invention.

FIG. 2 is a phase diagram drawn in triangular coordinates for a ternary system composition illustrating the manner of selecting the range of composition to be employed in carrying out the invention, and FIG. 3 is the diagram of the type of hysteresis loop obtained.

FIG. 1 illustrates a type of memory element having a pair of input terminals 11 and 12, to which a setting pulse is applied and which may be interrogated by applying a resetting pulse which will reset it and pass current only if the pulse is in the reverse direction. The element in this case is in the form of a ceramic disc 13, having upper and lower faces with an electrode 14, applied to the upper face 15, and a corresponding electrode 16, applied to the lower face. The terminals 11 and 12 are electrically connected to the electrodes 14 and 16, respectively. The invention is not limited, however, to the use of an element of this construction and does not exclude the use of ceramic blocks of rectangular or other form, wafers, tubes, or other shapes, or having separate input and output terminals with, for example, separate electrodes on the opposite face connected to input and output terminals.

The block 13 is composed of a ternary or quaternary composition in which two or three compounds having a perovskite lattice structure are in solid solution with an additional compound having a somewhat similar structure such as lanthanum ferrite or lanthanum aluminate, in which iron is replaced by aluminum.

Lead zirconate titanate, $Pb(Zr_1—xTi)O_3$, has the perovskite structure $ABO_3$ in which $Pb^{2+}$ occupies the A position and $Zr^{4+}$ and $Ti^{4+}$ share the B position. If a small five-valent element such as $Nb^{5+}$ enters the lattice at the B position, it has been found that the resistivity is increased by the substitution of the donor atom $Nb^{5+}$. The same occurs if a large three-valent atom such as $Bi^{3+}$ or a large trivalent rare-earth atom such as $La^{3+}$ enters the lattice at the A position. In these cases the substituent, termed a donor, creates lattice vacancies in the A position (lead vacancies). These increase the resistivity.

In a preferred composition the system is ternary and two of the constituents are mixed oxides of a large atom metal such as lead in the A position of a perovskite lattice, $ABO_3$, and small ionic radius elements such as zirconium and titanium in the B position, each of the latter being tetravalent since the lead is bivalent. The proportions of lead titanate, lead zirconate and lanthanum ferrite were so chosen as to be represented by a point lying within the area 17 on FIG. 2 which is close to the intersection point of the boundaries between phases, $F_R$ in which the composition is ferroelectric with a rhombohedral structure, $F_T$, ferroelectric with a tetragonal structure and $A_T$ antiferroelectric with a tetragonal structure. The area 17 is within the ferroelectric tetragonal region $F_T$ but lies very close to the antiferroelectric region $A_T$. It will be understood that in this type of ternary system there is also a paraelectric region C, in which the crystal structure is cubic. However, the area 17 is chosen to be closer to the boundary between the ferroelectric rhombic and the ferroelectric tetragonal regions, $F_R$ and $F_T$, respectively. The exact locations of the boundary lines between the regions $F_T$, $F_R$ and $A_T$ depend upon the perovskite compounds employed. Consequently, the area is best defined by its proximity to these boundary lines and the common point, rather than by percentages of each constituent.

These compositions, particularly those with a fairly sizable content of lanthanum ferrite $LaFeO_3$ combine fairly substantial piezoelectric coupling factors ($k_p$ approaching 0.4) with extremely minute lattice distortion. This circumstance violated previous theoretical preconceptions, as electrostrictive effect and the magnitude of the polarization had previously been considered to be functions of the lattice distortion. Previous low distortion compositions have shown much weaker levels of piezoelectricity ($k_p$ approximately 0.15).

In order to obtain adequate resistivity with measurable quasi-static hysteresis loops, relatively low coercive field with a good slow loop squareness of the hysteresis loop, and good poling properties, a donor additive was employed. For example, a donor element such as antimony was added. This had the dual effect of furnishing an extra electron as a five valent ion replacing a four valent ion (titanium or zirconium) in the same lattice site, and of generating $Pb^{2+}$ site vacancies. It is believed that the extra electron counteracts the usual p-type conduction, thus raising the electrical volume resistivity by as much as 3 to 4 decades in the ordinary temperature range. Simultaneously the Pb-site vacancies, which are mobile, facilitate domain wall rearrangement, thus lowering the coercive field and improving slow loop squareness and poling properties. In one formulation which gave good results with the ternary system of lead titanate, lead zirconate and lanthanum ferrite, about 2 atom percent of antimony was added.

An example of composition having excellent properties is:

$$[Pb_{.99}Sb_{.02}(Zr_{.66}Ti_{.34})_{.98}O_3]_{0.9}(LaFeO_3)_{0.1}$$

In a range between 32 and 40 atom percent titanium lattice distortion was low and piezoelectric coupling factors were high as shown in the following table:

TABLE I $[Pb_{.89}La_{.10}(Zr_{1-w}Ti_{.w})_{.88}Sb_{.02}Fe_{.10}O_3]$

| Composition | Loop type | $E_c$, kv./cm. | $P_R$, $\mu C/cm.^2$ | $P_S$, $\mu C/cm.^2$ | Ferroelectric tetragonal distortion, c/a | Planar coupling factor, $k_p$ |
|---|---|---|---|---|---|---|
| w=.26 | Pinched [1] | | | | | |
| w=.28 | do | | | | | |
| w=.30 | do | | | | | |
| w=.32 | Ferroelectric | 6.4 | 17 | 27 | [2] Very small | 0.27 |
| w=.34 | do | 7.4 | 18 | 26 | [2] 1.007 | 0.30 |
| w=.36 | do | 8.3 | 18 | 25 | 1.010 | 0.29 |
| w=.38 | do | 9.5 | 19 | 26 | 1.011 | 0.30 |
| w=.40 | do | 10.0 | 19 | 28 | 1.012 | 0.29 |

[1] Probably containing both Antiferroelectric and Ferroelectric phases.
[2] Very good endurance and very rapid switching.

The combination of properties, particularly the low distortion and the high coupling factor, render the ceramic composition favorable for memory applications.

It was found that the degradation resulting from repeated reversals of polarization in compositions heretofore known was accompanied by intergranular microcracking. Nevertheless, low lattice distortion was achieved in compositions in accordance with the invention, producing minimum swtiching strain and better endurance to repeated reversals.

Switching demonstrations of the composition showed little or no deterioration of the hysteresis loop in 10 thousand million square wave reversals with one microsecond square wave switching fields. Also, the composition could be charged and discharged at rates that would fracture almost any other composition ever tested. Consequently, the antimony-modified lead zirconate-titanate lanthanum ferrite ceramics offer great advantages for memory applications, especially for those involving interrogation by resetting pulses. These ceramics are also very promising for fast charge and discharge capacitors, having been charged in as little as 20 nanoseconds at a field of $3E_c$ (slow loop value) without mechanical or dielectric failure and only 10 nanoseconds at $5E_c$.

The invention is not limited to use of antimony as a substitute nor to the proportions of lead described in the foregoing examples. For example, a pentavalent element such as niobium or tantalum may be utilized instead of antimony as a substituent and lead may be replaced in part by barium or by an element such as bismuth or tungsten.

The preferred proportions of barium to the total of lead and barium is approximately 5 atom percent and gives best results under 15 percent, preferably between 3 and 10 percent.

Tests of the following compositions have been made and quasi-static hysteresis loops have been obtained to evaluate coercive field and polarization, as follows:

| | $E_c$, KV/cm. | $P_R$, micro coul./cm.$^2$ | Tetragonal distortion, c/a |
|---|---|---|---|
| $Pb_{.895}La_{.10}(Zr_{.66}Ti_{.34})_{.87}Sb_{.03}Fe_{.10}O_3$ | 24 | 8, 7 | 1.014 |
| $Pb_{.89}La_{.10}(Zr_{.66}Ti_{.34})_{.88}Nb_{.02}Fe_{.10}O_3$ | 10 | 23 | 1.011 |
| $Pb_{.87}Bi_{.02}La_{.10}(Zr_{.66}Ti_{.34})_{.90}Fe_{.10}O_3$ | 9 | 24 | 1.011 |
| $Pb_{.88}La_{.10}(Zr_{.66}Ti_{.34})_{.875}Nb_{.02}U_{.005}Fe_{.10}O_3$ | 8 | 21 | 1.008 |

In the preovskite lattice as hereinbefore described the metals in the B position are tetravalent. A mixed oxide may also be employed in which metals of different valences are employed in the B position in such proportions as to give an average valence of four. For example, the composition may be represented by the formula:

$$[A_{.99}D_{.02}B_{.98}O_3]_{0.9}(LaFeO_3)_{0.1}$$

where the B position metals are $$(X_{1/3}Y_{2/3})4+$$

where X is a bivalent metal such as zinc or magnesium and Y is a pentavalent metal such as niobium, which gives an average valence of four, and D is a donor metal such as antimony or tantalum, which is pentavalent.

When a donor is substituted in the A position, suitable examples are $La^{3+}$ and $Bi^{3+}$. Up to between 3 and 5 atom percent may be used. In the case of $La^{3+}$ it is present both as a substituent for a portion of the lead and also in the lanthanum ferrite constituent of the solid solution.

It will be understood that in the phase diagram of FIG. 2, the positions and slopes of the boundary lines are somewhat dependent upon the particular additives used; however, in any case, there is a triple point at which the tetragonal ferroelectric, the antiferroelectric, and the rhombohedral ferroelectric phases co-exist. Also, there is a boundary between the tetragonal ferroelectric and the tetragonal antiferroelectric phases. Both are extremely unusual circumstances in modified lead zirconate titanate systems.

With reference to the boundary between the tetragonal ferroelectric and the tetragonal antiferroelectric phases, the lattice distortion increases as composition is moved to the left, away from the boundary, within the tetragonal ferroelectric field. The compositions with extremely good endurance are near the boundary. Although the boundary is represented in the diagram of FIG. 2 as a line, there is some coexistence of the tetragonal ferroelectric and the antiferroelectric phases, so that a sharp, definite compositional limitation cannot be drawn precisely. The shaded area 17 is believed to contain the preferred compositions, but it must be positioned with respect to the phase boundaries rather than with respect to the exact numerical compositions. Compositions showing good properties are those consisting of low distortion crystallites of tetragonal ferroelectric symmetry. Good endurance may also be anticipated from the rhombohedral ferroelectric phases adjacent to the antiferroelectric tetragonal phase.

The area shown contains six to seventeen mole percent of lanthanum ferrite $LaFeO_3$ plus a donor additive, preferentially, 2 atom percent of antimony, plus proportions of lead zirconate and lead titanate shown to yield low distortion crystallites in the tetragonal ferroelectric phase. These are preferentially embodied in a hot pressed ceramic with suitable electrodes.

The donor additives improve resistivity. However, their most important function is believed to be preventing the gradual reduction and increasing electrical conductivity that would normally occur in a titanate ferroelectric in repeated switching cycles. This gradual reduction along with microcrack formation would normally preclude the endurance actually demonstrated by the aforesaid compositions.

The invention is not limited to the use of lead zirconate and some or all of the zirconium may be replaced by a metal of similar properties such as hafnium.

Although certain additives such as antimony have been proposed heretofore in certain simpler ceramics such as lead zirconium titanate, additives which produce certain results in connection with a compound such as lead zirconium titanate have not been found to produce the same results in the ternary and quaternary compounds including lead zirconate, lead titanate and lanthanum ferrite. It was not until the ternary system including lanthanum ferrite was employed that it became possible to obtain good switching characteristics in material that is capable of withstanding very numerous steep pulses and which will not become degraded. The favorable properties result when the composition is near the triple point of the phase diagram and the additive is present.

In order to obtain good switching characteristics including the ability to withstand very numerous applications of steep pulse without degradation and in order to obtain fast response to pulses it is necessary to employ material having a low unit distortion. Low unit distortion is accomplished in the ternary and quaternary systems when the proportions are such as to be close to the triple point.

Where the perovskite ferroelectric oxide is of the type having a divalent metal in the A position the select donor additive may be determined from the following table giving the valences and ionic radii of various metals.

| | Ionic radius | | Lattice site |
|---|---|---|---|
| Metal: | | | |
| $Pb^{2+}$ | [1] 1.18 | | A |
| $La^{3+}$ | 1.15 | Donor | A |
| $Fe^{3+}$ | 0.80 | Acceptor | B |
| $Nb^{5+}$ | .7 | Donor | B |
| $Ta^{5+}$ | .68 | do | B |
| $Sb^{5+}$ | .62 | do | B |
| $U^{6+}$ | Small | do | B |
| $Bi^{3+}$ | 1.20 | do | A |
| $Ba^{2+}$ | 1.38 | Iso (no activity) | A |
| $Ca^{2+}$ | 1.05 | do | A |
| $Sn^{4+}$ | .70 | do | B |

[1] Angstron.

In preparing ceramics for use in switches and memory elements the ceramic materials described were prepared in accordance with well known ceramic procedures and made into discs of approximately one-half inch diameter to which were applied silver electrodes in the customary manner. Then each disc was separately tested to determine the shape of the hysteresis curve obtained.

The preferred method of preparing the basic compositions entails the use of lead oxide (PbO), zirconia ($ZrO_2$), titania ($TiO_2$), and antimony trioxide ($Sb_2O_3$). Where barium or bismuth are employed the barium was obtained in the form of barium carbonate ($BaCO_3$) and bismuth in the form of bismuth trioxide ($Bi_2O_3$). The lanthanum ferrite is introduced into the solid solution with the other ingredients as lanthanum oxide ($La_2O_3$) and ferric iron oxide ($Fe_2O_3$). The materials are weighed out, milled wet, filtered and dried. The composition is calcined in open saggers at about 1550° F. for two hours. It is then advisable to remill to a fine particle size, filter and dry. The usual binders are added and the piece fabricated (extrude, mold, pellet, etc.). The binders are then removed by firing the pieces in open settings at 1200° F. to 1400° F. for one-half hour. Subsequently, this material is fired to maturation in covered refractory dishes, generally with a pellet of lead zirconate to provide a lead oxide atmosphere to thus prevent loss of weight due to volatilization of lead oxide.

The fired pieces are lapped to provide smooth parallel surfaces. The electrodes are then applied to these surfaces in a manner known to those skilled in the art.

The fact that the composition is near the triple point of three different phases signifies a greater degree of freedom for the atoms in the lattice and thus less distortion. Atom arrangement may shift directly or indirectly through two or more phases. The switching of the polarization around inside the lattice does not cause the same amount of strain that would take place if there were a large distortion. These circumstances appear to be favorable from the standpoint of obtaining very rapid switching and of avoiding degradation during switching.

Certain embodiments of the invention and certain methods of operation embraced therein have been shown, and particularly described for the purpose of explaining the principle of operation of the invention and showing its application, but it will be obvious to those skilled in the art that many modifications and variations are possible, and it is intended, therefore, to cover all such modifications and variations as fall within the scope of the invention.

What is claimed is:

1. A ferroelectric ceramic composition consisting of a solid solution selected from the group consisting of:

$$Pb_{.895}La_{.10}(Zr_{.66}Ti_{.34})_{.87}Sb_{.03}Fe_{.10}O_3$$
$$Pb_{.89}La_{.10}(Zr_{.66}Ti_{.34})_{.88}Nb_{.02}Fe_{.10}O_3$$
$$Pb_{.87}Bi_{.02}La_{.10}(Zr_{.66}Ti_{.23})_{.90}Fe_{.10}O_3$$
$$Pb_{.88}La_{.10}(Zr_{.66}Ti_{.34})_{.875}Nb_{.02}U_{.005}Fe_{.10}O_3$$

2. A ferroelectric ceramic composition consisting of a solution of the formula:

$$Pb_{.89}La_{.10}(Zr_{1-w}Ti_{w})_{.88}Sb_{.02}Fe_{.10}O_3$$

wherein $w$ has a value within the range of .32 to .40.

3. A ferroelectric ceramic composition as set forth in claim 2 wherein $w$ is .34.

4. As an article of manufacture a ferroelectric memory element comprising a body adapted to receive electrodes, said body being composed of the composition set forth in claim 3.

References Cited

Ikeda et al., "Japanese Journal of Applied Physics," vol. 3, pp. 63–71 (1964).

Ikeda et al., "Japanese Journal of Applied Physics," vol. 3, pp. 493–94 (1964).

JAMES E. POER, Primary Examiner

J. COOPER, Assistant Examiner

U.S. Cl. X.R.

106—39; 340—173.2

UNITED STATES PATENT OFFICE
CERTIFICATE OF CORRECTION

Patent No. 3591504 Dated July 6, 1971

Inventor(s) Bernard Jaffe

It is certified that error appears in the above-identified patent and that said Letters Patent are hereby corrected as shown below:

Column 2, line 3, after the word "this" insert -- third --.

line 22, change "composition" to read -- compositions -

Column 5, line 13, correct the spelling of "perovskite".

Column 8, line 6, change "$Ti_{.23}$" to read -- $Ti_{.34}$ --.

, line 8, after "of a" insert -- solid --.

Signed and sealed this 28th day of December 1971.

(SEAL)
Attest:

EDWARD M.FLETCHER,JR.
Attesting Officer

ROBERT GOTTSCHALK
Acting Commissioner of Patents